United States Patent
Zahemszky et al.

(10) Patent No.: US 10,715,453 B2
(45) Date of Patent: Jul. 14, 2020

(54) METHOD AND NETWORK NODE FOR CONGESTION MANAGEMENT IN A WIRELESS COMMUNICATIONS NETWORK

(71) Applicant: TELEFONAKTIEBOLAGET L M ERICSSON (PUBL), Stockholm (SE)

(72) Inventors: András Zahemszky, Sollentuna (SE); Szilveszter Nádas, Budapest (HU); Lars Westberg, Enköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 213 days.

(21) Appl. No.: 14/906,761

(22) PCT Filed: Jul. 24, 2013

(86) PCT No.: PCT/SE2013/050928
§ 371 (c)(1),
(2) Date: Jan. 21, 2016

(87) PCT Pub. No.: WO2015/012748
PCT Pub. Date: Jan. 29, 2015

(65) Prior Publication Data
US 2016/0164791 A1    Jun. 9, 2016

(51) Int. Cl.
*H04L 12/825* (2013.01)
*H04L 12/801* (2013.01)
(Continued)

(52) U.S. Cl.
CPC .......... *H04L 47/25* (2013.01); *H04L 47/12* (2013.01); *H04L 47/22* (2013.01);
(Continued)

(58) Field of Classification Search
None
See application file for complete search history.

(56) References Cited

U.S. PATENT DOCUMENTS

| 8,358,577 B1 | 1/2013 | Khanka et al. |
| 2010/0220594 A1* | 9/2010 | Racz ............... H04L 47/10 370/235 |

(Continued)

FOREIGN PATENT DOCUMENTS

| WO | 02/052886 A1 | 7/2002 |
| WO | 2012/121635 A1 | 9/2012 |

(Continued)

OTHER PUBLICATIONS

International Search Report and Written Opinion of the ISA issued for the corresponding International Patent Application No. PCT/SE2013/050928 dated May 7, 2014, 13 pages.

(Continued)

*Primary Examiner* — Kodzovi Acolatse
*Assistant Examiner* — Jay L Vogel
(74) *Attorney, Agent, or Firm* — Sage Patent Group (57) ABSTRACT

Method in and a network node (160; 110; 401*a*, 600) for congestion management of a transport network (130) comprised in a wireless communications network (100). The wireless communications network (100) further comprises a base station (110; 401*a*) configured to receive data being transported via a data transport path (132; 404*a,d*) of the transport network (130) and to transmit the received data to one or more wireless devices (120) served by the base station (110; 401*a*). The network node obtains (302; 409; 501) an indicator indicating at least a risk for occurrence of downlink data congestion in the data transport path (132; 404*a,d*). To reduce said at least risk, the network node then controls (304; 411; 502) the base station (110; 401*a*) to reduce and/or limit a throughput rate of data being transmitted to the one or more wireless devices (120). The data is received by the base station (110; 401*a*) via the data transport path (132, 404*a,d*).

12 Claims, 6 Drawing Sheets

(51) Int. Cl.
| | |
|---|---|
| *H04L 12/815* | (2013.01) |
| *H04W 28/02* | (2009.01) |
| *H04W 88/16* | (2009.01) |
| *H04L 12/851* | (2013.01) |
| *H04L 12/853* | (2013.01) |
| *H04L 12/26* | (2006.01) |

(52) U.S. Cl.
CPC ....... *H04W 28/0247* (2013.01); *H04W 88/16* (2013.01); *H04L 43/0817* (2013.01); *H04L 43/16* (2013.01); *H04L 47/14* (2013.01); *H04L 47/2408* (2013.01); *H04L 47/2416* (2013.01); *H04L 47/2441* (2013.01); *H04L 47/29* (2013.01)

(56) References Cited

U.S. PATENT DOCUMENTS

| | | | | |
|---|---|---|---|---|
| 2010/0274871 | A1* | 10/2010 | Harrang | H04L 1/0002 709/217 |
| 2011/0044168 | A1* | 2/2011 | N Das et al. | H04L 1/0002 370/232 |
| 2012/0051216 | A1* | 3/2012 | Zhang | H04L 47/12 370/230 |
| 2012/0127863 | A1* | 5/2012 | Yi | H04L 47/14 370/235 |
| 2012/0218892 | A1* | 8/2012 | Kotecha | H04L 47/14 370/235 |
| 2012/0250570 | A1* | 10/2012 | Parker | H04L 43/0882 370/253 |
| 2013/0021933 | A1* | 1/2013 | Kovvali | H04W 88/18 370/252 |
| 2013/0132559 | A1* | 5/2013 | Kotecha | H04L 43/0876 709/224 |
| 2013/0242727 | A1* | 9/2013 | Shaikh | H04L 12/24 370/230 |

FOREIGN PATENT DOCUMENTS

| | | |
|---|---|---|
| WO | 2013/036183 A1 | 3/2013 |
| WO | 2013/050062 A1 | 4/2013 |
| WO | 2014/039154 A1 | 3/2014 |

OTHER PUBLICATIONS

Ekelin et al., Real-Time Measurement of End-to-End Available Bandwidth using Kalman Filtering, 2006 IEEE/IFIP Network Operations and Management Symposium NOMS 2006, Vancouver, BC, Apr. 2006, pp. 73-84. doi: 10.1109/NOMS.2006.1687540, 12 pages.

Kutscher et al., Mobile Communication Congestion Exposure Scenario, CONEX WG, Internet-Draft, Jan. 10, 2013, 22 pages.

Pan et al., PIE: A Lightweight Control Scheme to Address the Bufferbloat Problem, Internet Draft, Network Working Group, Dec. 10, 2012, 12 pages.

Baillargeon et al., Ericsson Two-Way Active Measurement Protocol (TWAMP) Value-Added Octets, Internet Engineering Task Force (IETF), Request for Comments: 6802, Nov. 2012, 16 pages.

Supplementary European Search Report issued in related Application No. 13889948.9, dated Jun. 27, 2016, 4 pages.

* cited by examiner

METHOD AND NETWORK NODE FOR CONGESTION MANAGEMENT IN A WIRELESS COMMUNICATIONS NETWORK

CROSS REFERENCE TO RELATED APPLICATION(S)

This application is a 35 U.S.C. § 371 National Phase Entry Application from PCT/SE2013/050928, filed Jul. 24, 2013, designating the United States, the disclosure of which is incorporated by reference.

TECHNICAL FIELD

Embodiments herein relate to a method in and a network node in a wireless communications network. In particular embodiments herein relate to congestion management of a transport network comprised in a wireless communications network.

BACKGROUND

Communication devices such as wireless devices may be also known as e.g. user equipments, mobile terminals, wireless terminals and/or mobile stations. A wireless device is enabled to communicate wirelessly in a cellular communications network, wireless communications system, or radio communications system, sometimes also referred to as a cellular radio system or cellular network. The communication may be performed e.g. between two wireless devices, between a wireless device and a regular telephone and/or between a wireless device and a server via a Radio Access Network (RAN) and possibly one or more core networks, comprised within the cellular communications network.

The wireless device may further be referred to as a mobile telephone, cellular telephone, laptop, Personal Digital Assistant (PDA), tablet computer, just to mention some further examples. The wireless device in the present context may be, for example, portable, pocket-storable, hand-held, computer-comprised, or vehicle-mounted mobile device, enabled to communicate voice and/or data, via the RAN, with another entity, such as another wireless device or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. By the base station serving a cell is meant that the radio coverage is provided such that one or more wireless devices located in the geographical area where the radio coverage is provided may be served by the base station. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile). In 3rd Generation Partnership Project (3GPP) Long Term Evolution (LTE), base stations, which may be referred to as eNodeBs or eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

In the context of this disclosure, the expression downlink (DL) is used for the transmission direction from the base station to the wireless device, including also the direction from the core network, via the base station, to the wireless device. The expression uplink (UL) is used for the transmission path in the opposite direction i.e. from the wireless device to the base station.

A wireless communications network comprises a transport network that refers to underlying infrastructure responsible for the physical data transport in the wireless communications network. For example, in case of a wireless communications network comprising a core network and a radio access network, the transport network interconnects the core network and the radio access network, parts thereof, and may also include parts that may not belong to neither the core network nor the radio access network since these are typically defined on a logical level, while the transport network is defined on physical level. It is realized that there may be physical entities in the infrastructure that are not defined, and/or are not relevant to discuss as belonging to either one of the core network or the radio access network. In 3GPP networks, Quality-of-Service (QoS) is usually provided and associated with radio bearers of data. When a radio bearer is set up, the QoS parameters, such as Quality of Service Class Indicator (QCI), etc. are indicated to the radio access network, e.g. a scheduler therein, so it will be able to apply specific treatment to data associated with the radio bearer.

When a packet arrives to the wireless network, typically to the core network via a gateway node. from e.g. the Internet, the gateway node determines which bearer the packet belongs to. This is typically done by inspecting a 5-tuple in the packet and trying to match it with Traffic Flow Templates (TFTs). If a match is found, the packet is associated with the bearer and a QCI. The QCI is further translated to a Differentiated Services CodePoint (DSCP) value or Ethernet p-bits that are honoured in the e.g. routers, switches and hubs of the transport network.

However, there are certain cases when the transport network does not provide Quality-of-Service differentiation and the DSCP values and/or/Ethernet p-bits are not honoured. This may happen in cases when an operator of the wireless communications network does not configure QoS in parts of the transport network, such as said routers, switches and hubs, which may be a cumbersome and error-prone process. In some cases the operator might use cheap network elements not supporting sophisticated QoS-differentiation. It may also be cases where the transport network might be out of the operator's control. Also, differentiation of traffic to different bearers is not always done for traffic originating from the Internet since it may require processing that is too high or not possible for other reasons, e.g. technical. As a result a majority of the traffic may be handled by so called best-effort bearers that are not associated with a particular QoS requirements and thus may not be handled accordingly in the transport network. Nevertheless, traffic originating from the Internet typically contains a significant amount of e.g. real-time interactive communications, such as audio, video calls, gaming applications, that would benefit from dedicated treatment and typically need low delays and jitter for good user experience.

With increasing radio capacity and increasing user generated traffic originating from e.g. the Internet it is foreseen that the transport network increasingly will become the weakest link and comprise bottlenecks and thereby experience congestion situations. This makes it of increasing interest to be able to efficiently manage congestion situations in the transport network.

As mentioned above, in some wireless communications networks the transport network does not support QoS specific handling and only implements simple queuing strategies in e.g. switches and routers, without any differentiation of data transport flows. This means that in a congestion situation it is not possible to differentiate data transport flows in the transport network and thus not possible to provide prioritized treatment although this would be desirable. In such situation the end-to-end QoS will be determined by the weakest link involved. In such cases, and also in cases of transport networks that are QoS-unaware, only best effort service class may be offered.

SUMMARY

An object of embodiments herein is to enable improved congestion management of a transport network comprised in a wireless communications network.

According to a first aspect of embodiments herein, the object is achieved by a method in a network node for congestion management of the transport network. The wireless communications network comprises a base station configured to receive data being transported via a data transport path of the transport network and to transmit the received data to one or more wireless devices served by the base station. The network node obtains an indicator indicating at least a risk for occurrence of downlink data congestion in the data transport path. To reduce said at least risk the network node then controls the base station to reduce or limit a throughput rate of data being transmitted to the one or more wireless devices. The data is received by the base station via the data transport path.

According to a second aspect of embodiments herein, the object is achieved by a network node for congestion management of the transport network. The wireless communications network comprises a base station configured to receive data being transported via a data transport path of the transport network and to transmit the received data to one or more wireless devices served by the base station. The network node comprises an obtaining circuitry configured to obtain an indicator indicating at least a risk for occurrence of downlink data congestion in the data transport path. The network node further comprises a control circuitry configured to control, to reduce said at least risk, the base station to reduce or limit a throughput rate of data being transmitted to the one or more wireless devices. The data is received by the base station via the data transport path.

By controlling the base station to reduce or limit the throughput rate of said data, this corresponds to introduction of an artificial congestion that have similar effect as moving an actual congestion from a bottleneck in the transport network to the base station or at least to a vicinity of the base station. Thereby the typically advanced and flexible handling of congestion at the radio interface will be applicable and used. Embodiments herein thus enable enforcement of QoS-policies and offer QoS-specific treatment that are already in existence and typically highly effective, well and especially adapted for data transport to wireless devices, but else not available for solving congestion problems upstream in the transport network.

BRIEF DESCRIPTION OF THE DRAWINGS

Examples of embodiments herein are described in more detail with reference to the appended schematic drawings, in which.

DETAILED DESCRIPTION

Figure 1:
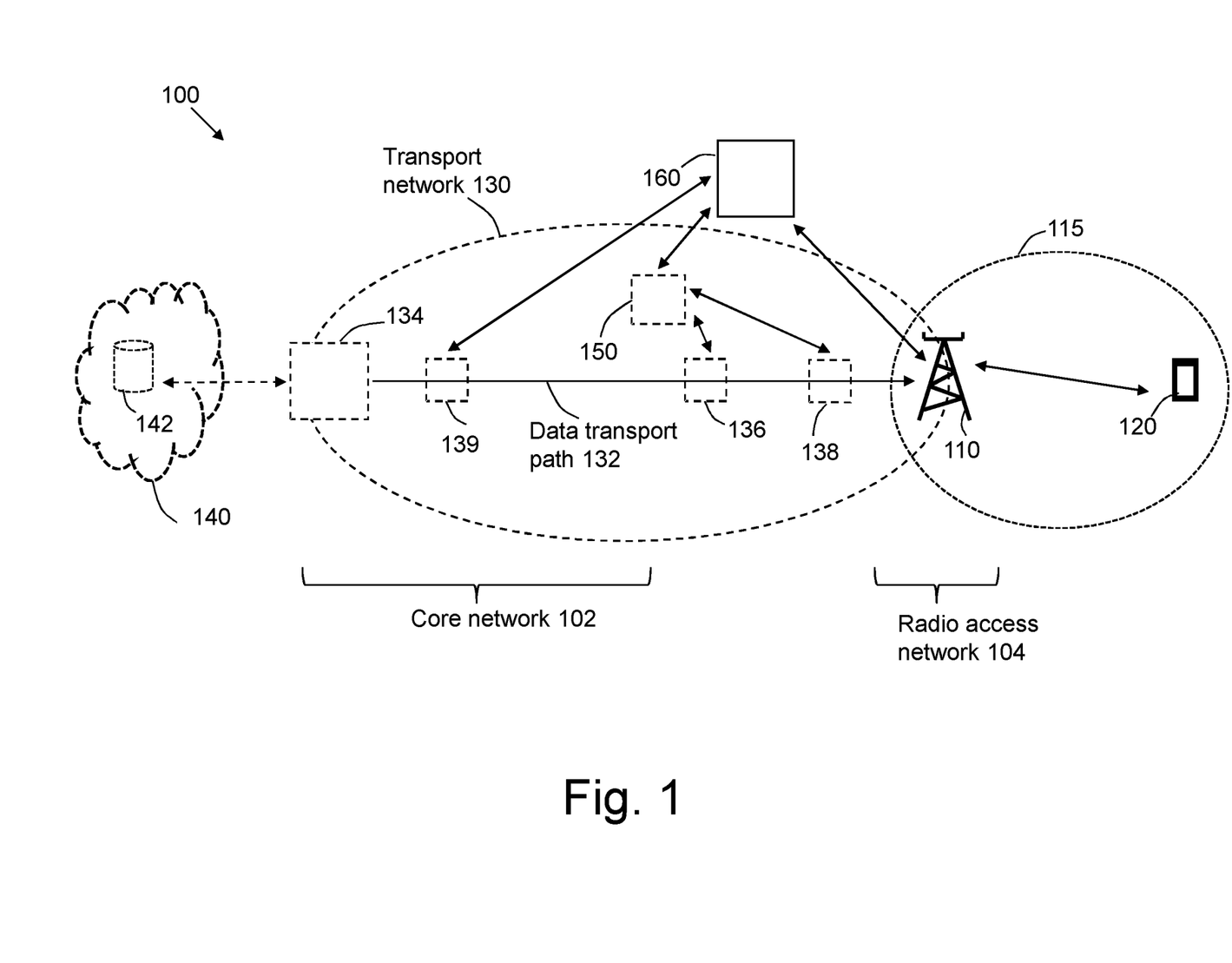
FIG. 1 is a schematic block diagram depicting a non-limiting example of a wireless communications network in which embodiments herein may be implemented.

FIG. 1 is a schematic block diagram depicting a non-limiting example of a wireless communications network 100, in which embodiments herein for congestion management of a transport network 130 comprised in a wireless communications network 100 may be implemented, and in relation to which embodiments herein will be explained. The transport network 130 refer to underlying infrastructure of the wireless communications network 100, which infrastructure is responsible for the physical data transport in the wireless communications network 100. The wireless communications network 100 is exemplified as comprising a core network 102 and a radio access network 104. In such cases, the transport network 130 interconnects the core network 102 and the radio access network 104, parts thereof, and may also include parts that may not belong to either the core network 102 or radio access network 104 as these are typically defined on a logical level, while the transport network is defined on physical level and there may be physical entities in the infrastructure that are not defined, and/or are not relevant to discuss as belonging to either one of the core network 102 or the radio access network 104, such as hubs, links etc. interconnecting the core network 102 and/or the radio access network 104 and/or parts thereof.

A data transport path 132 for transport of data is indicated in the transport network 132 and exemplified as extending between a gateway node 134, comprised in the transport network 130 and the core network 102, and a base station 110, comprised in the transport network 130 and the radio access network 104. The base station 110 is configured to serve, in a cell 115, one or more wireless devices 120. The gateway node 134 is a gateway to an external network 140, e.g. the Internet, which external network may comprise one or many data sources 142 from which data may be retrieved and transported via the data transport path 132 to the base station 110 for further transmission to the one or more wireless devices 120. Note that the base station 110 may receive data from several data sources for transmission that may be simultaneous to the one or more wireless devices 120. The several sources may not necessarily only be comprised in and enter from the external network although this typically is predominant. For example, data may also originate from other one or more wireless devices that e.g. may be served by another base station comprised in the wireless communications network.

The transport network 130 further comprises an upstream node 136 and a downstream node 138 that are located in the data transport path 132. Upstream and downstream is in relation to a downlink direction of data transport, i.e. in direction to the base station and the one or more wireless devices 120. By a node being located in the data transport path 132 is referred to that the node is configured to take part in the transport of data in the data transport path. The upstream node 136 may also be referred to as a hub site node and the downstream node as a cell site node in the following. For reasons that will be understood from the below, the upstream node 136 and the downstream node 138 are nodes that are controllable, e.g. by the operator of the wireless communications network 100. Moreover, the transport network 130 also comprises a data rate limiting node 139 located in the data transport path 132, which will be discussed further below. Lastly, the shown wireless communications network 100 comprises a measuring node 150 and a radio resource management node 160. The measuring node 150 is configured to receive measurement data from the upstream node 136 and the downstream node 138. The measuring node 150 may be comprised and/or be implemented as a server for active measurements and will be further discussed below. The radio resource management node 160 is a node for managing and controlling radio resources to be used by the that base station 110 and is an example of a network node that inter alia is in control of a throughput rate of data being transmitted by the base station 110 to the one or more wireless devices 120. The radio resource management node 160 may typically correspond to, or be configured to control, a node that comprises what commonly is referred to the scheduler for scheduling of resources to radio bearers that has been set up for communication of data associated with the one or more wireless devices 120. In e.g. LTE, the scheduler of a base station is comprised in the base station and the radio resource management node 160 may likewise be comprised in the base station 110, as will be exemplified in FIG. 2. In e.g. UMTS based systems the radio resource management node 160 may correspond to the Radio Network Controller (RNC) node that is separate from the base station 110.

Note that the measuring node 150 in the example is shown comprised in the transport network 130 and the radio resource management node 160 is shown outside the transport network 130. However, for the general functionality of these nodes in the context of embodiments herein, they are not needed to belong to a particular sub-network of the wireless communications network 100 such as the transport network 130 and/or the core network 102 and/or the radio resource network.

Communicative connections between the nodes in FIG. 1 are indicated by arrows. The nodes presented above will are further explained and described below, first in an example relating to LTE.

Figure 2:
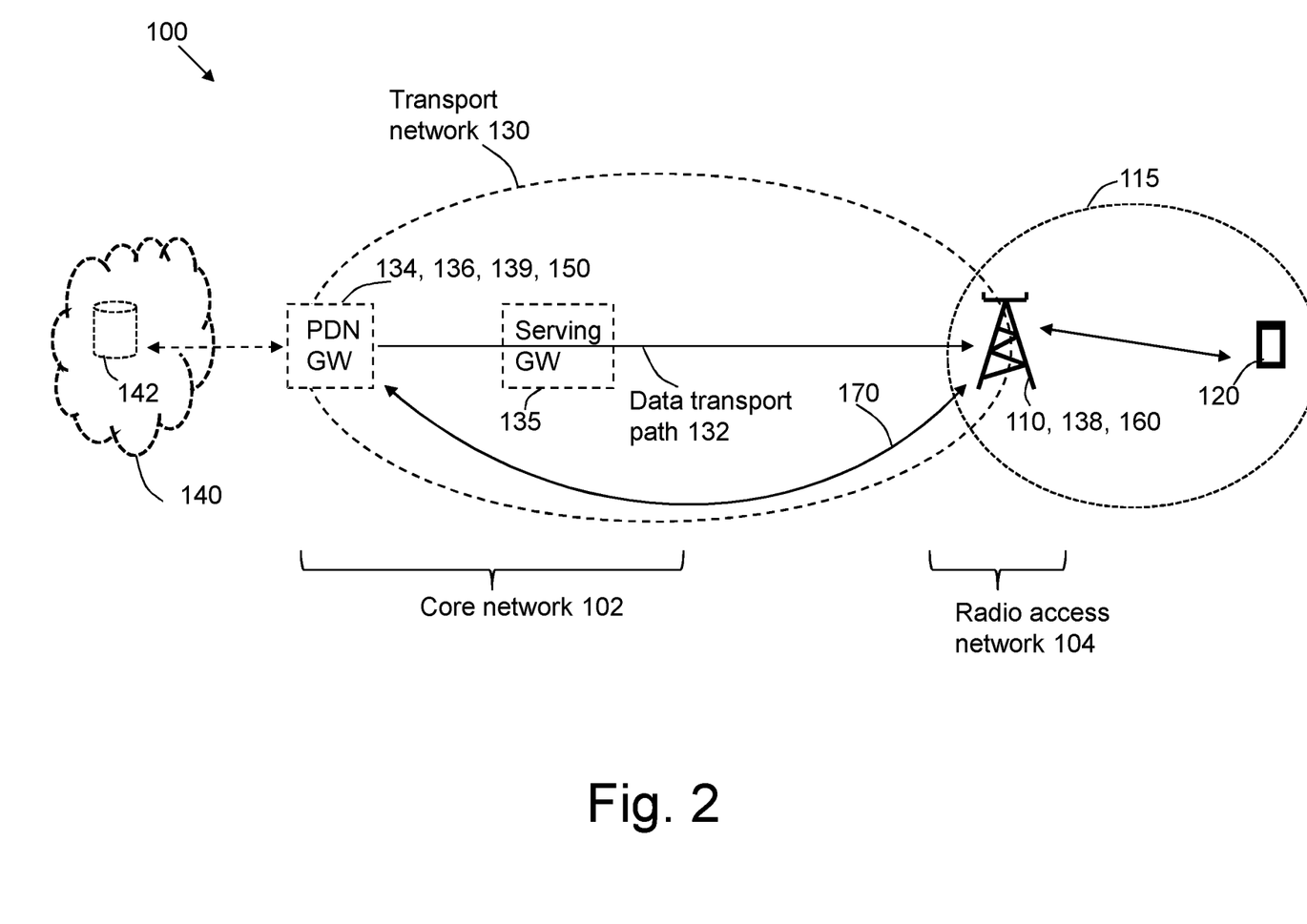
FIG. 2 is a schematic block diagram depicting the wireless communications network in an exemplifying LTE context.

FIG. 2 is a schematic block diagram depicting the wireless communications network 100 in an exemplifying LTE context. As recognized by the skilled person, in the context of LTE, the wireless communications network 100 may be referred to as an Evolved Packet System (EPS), the base station 110 be referred to as eNodeB, or eNB, the core network 102 as an Evolved Packet Core (EPC) and the radio access network 104 as an Evolved UTRAN (E-UTRAN), where UTRAN stands for UMTS Terrestrial Radio Access Network and UMTS is referring to Universal Mobile Telephone System.

In the shown example the downstream node 138 and the radio resource management node 160 are comprised in the base station 110 and the upstream node 136, the data rate limiting node 139 are comprised in the gateway node 134. In the example the gateway node 134 is shown comprised in the Packet Data network GateWay (PDN GW) known from LTE. Located in the data transport path is also shown the Serving GateWay (Serving GW) also known from LTE, here being an example of another upstream node 136. In other examples the upstream node 136 and/or the data rate limiting node 139 may instead be comprised in the Serving GW. A schematic communication path 170 is shown between the base station 110 and the gateway node 134, just for illustrating that the communicative connections indicated between the nodes in FIG. 1 by the arrows, need not take part over the data transport path 132. The communication path, as well as the communicative connections in FIG. 1, may be separate from the data transport path 132, or may be fully or partly overlapping.

It is again reminded that FIGS. 1-2 are only schematic and for exemplifying purposes. The wireless communications system 100 may, and typically will, in reality comprise several further nodes, base stations, wireless devices, as realized by the skilled person, but which are not shown herein for simplicity, and the shown nodes may be combined in different configurations. Hence, the situation shown in FIGS. 1-2 and discussed above, is not in every detail a prerequisite for embodiments herein, as should be understood by the skilled person, and in particular when considering the present disclosure as a whole.

One straightforward solution to mitigate congestion in the transport network 130 is to massively over-provision the network, and increasing the capacity periodically with the increased demands. By massive overprovisioning, the delays and packet losses may be kept sufficiently low for the packets of all transport flows, so the transport network 130 does not need to implement differentiated treatment. However, as the radio capacity is increasing with technologies such as LTE, LTE-Advanced and Heterogeneous Networks (HetNets), and also the volumes of traffic are increasing in the network by new and different type of user demands, a conservative over-provisioning would lead to very high Capital Expenditure (CAPEX) for the operator.

A second possible solution is to deploy a QoS-architecture, utilizing e.g. DSCP values or Ethernet p-bits. However, this option is not always available and even when it is, it requires configuration, which need to be often revisited and tuned to the new and increasing demands. Also, as the QoS provided in the wireless communications network 100 is dependent on both the QoS in the transport network 130 and in the radio domain, the operator has two separate places to configure and tune the specific QoS settings, and this has to be done in a coordinated way.

A third possible solution is to apply an artificial shaper at the entry point of the transport network 130 with a shaping bitrate just below the capacity of the transport network 130. That shaper can emulate network QoS support or even can do per bearer or per flow scheduling. The drawback of this solution is that this shaper requires high amount of processing capacity, it is a single point of failure and also the handling of the QoS is distributed, which is not desirable in some cases.

A fourth possible solution is to deploy an Active Queue Management (AQM) scheme in routers involved and that controls the delays of the packets. However, this typically requires modification in all intermediate routers and there are cases where the operator cannot do that, especially when the transport infrastructure is owned by or co-owned by other operator(s).

Embodiments herein relate to another solution.

Examples of embodiments herein relating to a method for congestion management of the transport network 130, will now be described with reference to the combined signaling diagram and flowchart depicted in FIG. 3. The actions may be taken in any suitable order.

Action 301a,b

The measuring node 150 performs a measurement of performance between the upstream node 136 and the downstream node 138. The measurement of performance may be based on a measurement protocol applied to data transport between the two nodes 136, 138, which thus involves some control of the upstream node 136 and the downstream node 138, e.g. injecting data at the upstream node 136 and retrieving and/or monitoring for the injected data at the downstream node 138. For example, the measurement protocol may be an active measurement protocol that provide measures of available bandwidth and/or capacity and/or utilization of bandwidth and/or of a bandwidth bottleneck, between the upstream node 136 and the downstream node 138. See for example Ekelin, S.; Nilsson, M.; Hartikainen, E.; Johnsson, A.; Mangs, J.-E.; Melander, B.; Bjorkman, M., "Real-Time Measurement of End-to-End Available Bandwidth using Kalman Filtering," *Network Operations and Management Symposium, 2006. NOMS 2006. 10th IEEE/IFIP*, vol., no., pp. 73, 84, 3-7 Apr. 2006. Such active measurement protocol may periodically find out the status of transport network 130. The measurement protocol may measure key performance indicators such as delay, delay variation, packet loss ratio, available bandwidth, etc.

Action 302

The measuring node 150 sends and the radio resource managing node 160 receives an indicator based on the measurement. The indicator may be sent independent on the measurement result as such or after identification, e.g. by that the measurement or history of measurements, indicate/s there being at least a risk for occurrence of downlink data congestion in the downlink data transport path 132, i.e. congestion in the transport of data over the data transport path 132 in a downlink direction. By "at least risk for occurrence of downlink data congestion" is meant to also include an actual occurrence of downlink data congestion. The indicator may e.g. comprise a binary indicator indicating congestion or no congestion and/or a load level indicator indicating a level of data load. The indicator may be sent repeatedly, e.g. periodically and/or in response to that measurements have been performed resulting in the indicator.

Action 303

The radio resource management node 160 decides to reduce said at least risk based on the received indicator, which in some embodiments involves reducing or removing data congestion that already has occurred and not only a risk thereof. In some embodiments this action may take part in the measuring node 150 and/or the action may be implicit, e.g. in case of the binary indicator or in case of a measurement or measurement protocol that only returns measurement data when there is a situation of congestion or a risk thereof.

Action 304

The radio resource management node 160 sends, in response to the decision, a command to the base station 110. The command commands the base station 110 to reduce and/or limit a throughput rate of data being transmitted to the one or more wireless devices 120, which data is received by the base station 110 via the data transport path 132. For example, when a risk for occurrence of data congestion is to be reduced before actual data congestion has occurred, it is typically desirable to limit the throughput rate rather than waiting and reducing after it first after data congestion actually has occurred. How the reduction and/or limitation may be accomplished and in relation to the measurement will be discussed separately below.

Action 305

The base station 110 receives the command and transmits, in response to the received command, the data to the one or more wireless devices 120 at the reduced and/or limited throughput rate.

The method exemplified above enables reduction of said at least risk of congestion although the base station 110 that transmits the data to the one or more wireless devices 120 is downstream a location of the congestion, or a location associated with the risk for congestion. The location of the at least risk for congestions may be referred to as a bottleneck in the data transport path. By controlling the base station 110 to reduce and/or limit the throughput rate of the data, an artificial congestion is introduced that have similar effect as moving an actual congestion, such as resulting in packet drops, long delays etc, from the bottleneck to the base station 110 or at least to a vicinity of the base station 110. Thereby the typically advanced and flexible handling of congestion at the radio interface and in the radio access network 104, inter alia involving the aforementioned scheduler, will be applicable and used. The radio resource management node 160 may thus enforce QoS-policies and offer QoS-specific treatment that are already in existence and typically highly effective, well and especially adapted for data transport to wireless devices, but else not available for solving congestion problems upstream, e.g. for congestion at a bottleneck in the core network 102. Also, as the majority of transport flows comprised in the data transport use Transmission Control Protocol (TCP) as transport protocol, the transport flows may adapt to the artificial congestions by conventional TCP congestion control algorithms, such as NewReno, Cubic etc. and similar.

Further advantages include that by enabling lower delays and potentially zero-packet loss ratio in the transport network 130, decisions affecting QoS will he centralized to e.g. the scheduler, which increase the possibility of accomplishing a desired end-to-end QoS. Also, QoS-unaware nodes in the transport network 130 become less of a problem.

Further advantages also include enablement of differentiated treatment to specific data transport flows without having to modify parts in the transport network 130 such as routers, switches and hubs.

Action 306

The radio resource management node 160 sends a command to the rate limiting node 139 located in the data transport path 132 upstream from the bottleneck in the data transport path 132. The command commands the rate limiting node 139 to reduce and/or limit a respective downlink data rate for one or more data transport flows.

Action 307

The rate limiting node 139 receives the command and the rate limiting node 139 reduces and/or limits, in response to the received command, the respective downlink data rate for the one or more data transport flows.

Actions 306 and 307 are for handling of e.g. non-adaptive and malicious traffic that at least in some situations may significantly contribute to congestion. This traffic refer to data transport flows that may not react by limiting its data rate in case of congestion and that thus results in packet drop. This e.g. include constant bitrate or other non-adaptive User Datagram Protocol (UDP) data transport flows that also may contribute to congestion. Such data transport flows may not reduce their data rate in the transport network in response to the reduced and/or limited throughput rate of the data being transmitted to the one or more wireless devices, i.e. in the radio domain. As a result such transport flows may waste resources unnecessarily in the transport network while unfairly competing with adapting data transport flows, such as TCP flows and other TCP-friendly flows, e.g Real-time Transport Protocol (RTP) flows using TCP Friendly Rate Control (TFRC) as congestion control mechanism.

Also, in some cases, there may even be TCP based applications that put an aggressive load on the network, when e.g. a web page download consists of several, e.g. 50, parallel TCP downloads. The many parallel slow starts could potentially cause uncontrolled bursts that would not be efficiently controlled by reducing and/or limiting the throughput rate, e.g. a serving rate of the scheduler.

How this action may be implemented and the downlink data rates of the transport may be reduced and/or limited in relation to the reduction and/or limitation in the throughput rate at the radio interface is further discussed below.

Figure 3:
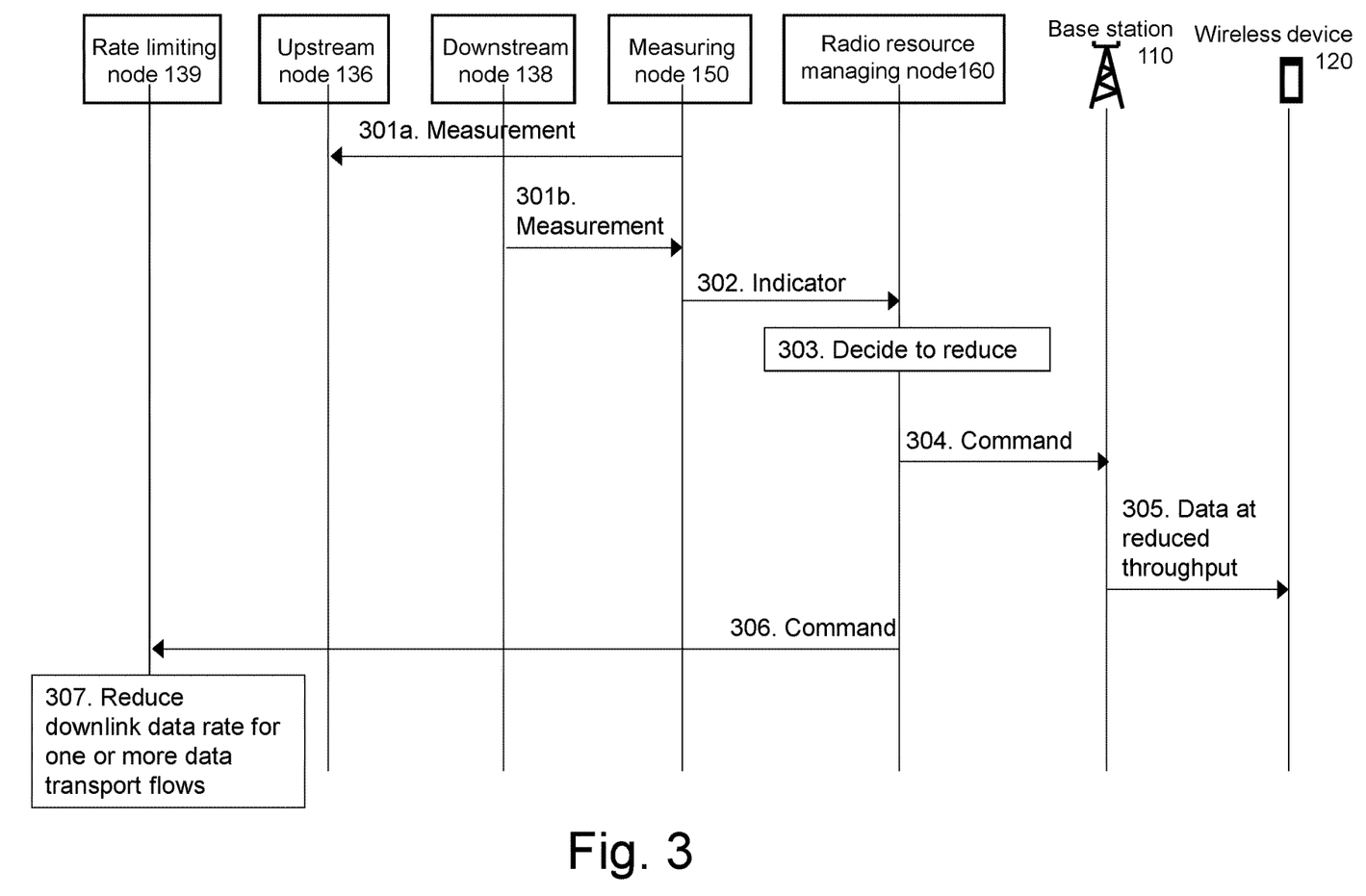
FIG. 3 is a combined signalling diagram and flow chart for illustrating examples of embodiments herein.

The information being sent/received in the example of FIG. 3 may be obtained internally and by other means in case of combination of some of the nodes, e.g. as exemplified in FIG. 2, and thus embodiments herein cover many different signaling schemes in addition to the one shown in FIG. 3. For example, a corresponding signaling scheme as in FIG. 3 in case of the situation shown in FIG. 2 would be greatly simplified.

The method according to embodiments herein may be described in a simplified manner by three steps: Measurement of certain transport network characteristics in the downlink direction, which corresponds to action 301-302. Then there is feedback, or rather "feed forward", based in the measurements being sent to the radio resource management node 160, which corresponds to action 302. The radio resource management node 160 then applies certain actions on downlink traffic based on the feedback, e.g. adjusts certain parameters in the radio domain to adapt to the situation in the transport network 130, which corresponds to actions 303-307. For example, as will be discussed in some detail below, if the feedback indicate an actual load in the transport network above a threshold, the radio resource management node 160 may create an artificial bottleneck in the air interface by essentially shaping the traffic to a certain bitrate lower than the load in the transport network.

Figure 4:
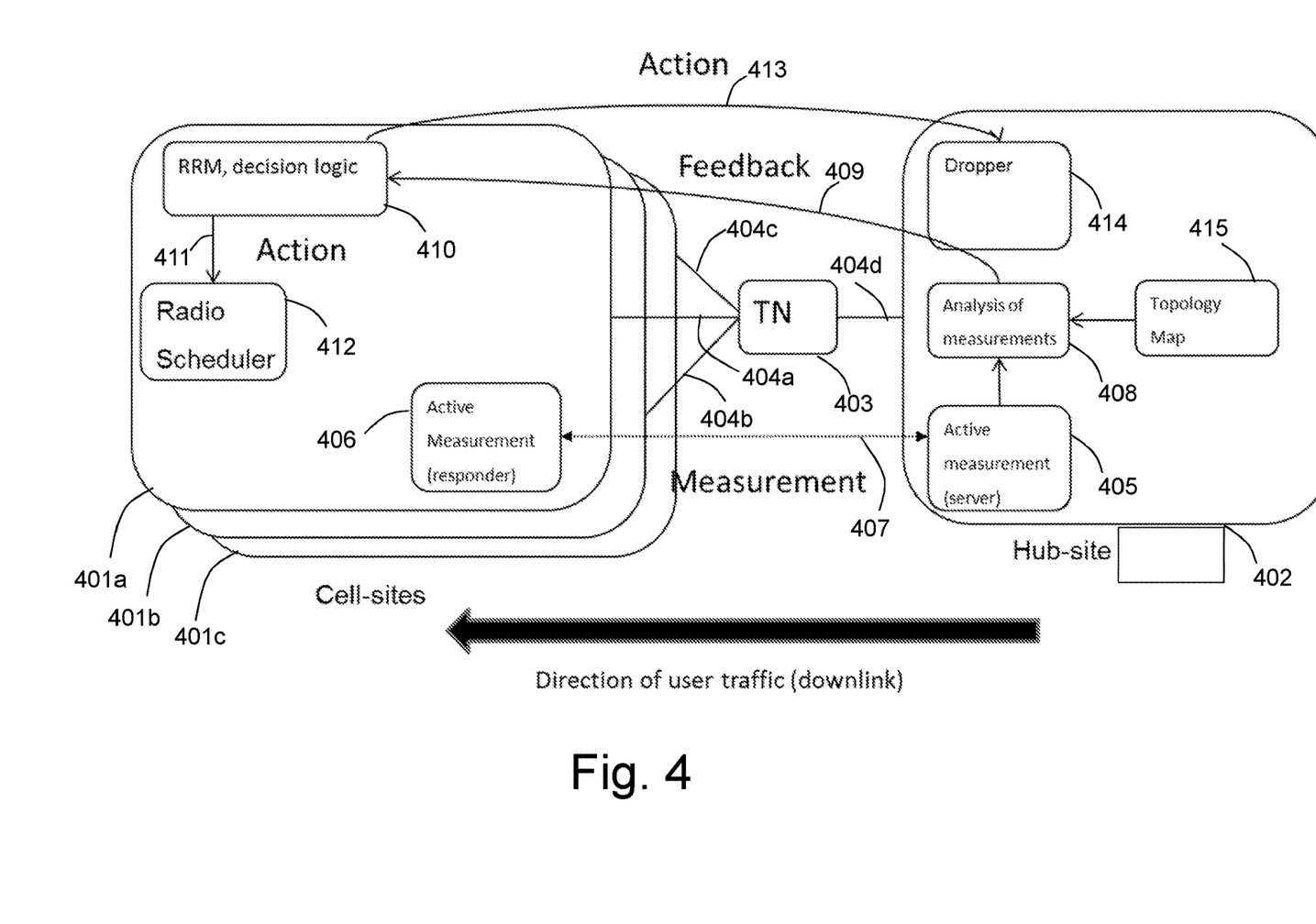
FIG. 4 is a schematic high level block diagram depicting in another view than above, the wireless communications network and for illustrating examples of embodiments herein.

FIG. 4 is a schematic high level block diagram depicting in another view than above, the wireless communications network 100. The block diagram shows both nodes and entities as well as actions, which, as also will be explained, overall correspond to what has been presented above. The depicted view corresponds to a situation similar to the situation shown in FIG. 2, where the downstream node 138 and the radio resource management node 160 are comprised in a node that in FIG. 4 is referred to as cell site 401a-c, and where any of the cell sites 401a-c may correspond to or comprise the base station 110, that is, each cell site 401a-c comprises at least one base station of its own. Hence, if e.g. cell site 401a corresponds to or comprises the base station 110, the other cell sites 401b-c correspond to or comprises one or more additional base stations. The upstream node 136, the data rate limiting node 139 are comprised in a node that in FIG. 4 is referred to as a hub site 402, which e.g. may correspond to the gateway node 134, e.g. the PDN Gateway or Serving Gateway in case of LTE, but may in principle be any node upstream from the cell site 401.

The shown hub site 402 comprises an active measurement server 405, an analysis of measurements entity 408, a topology map providing entity 415 and a dropper entity 414. The respective functionality of, and relations between, the entities will be realized from the below and from what has been discussed above. For example, the active measurement server 405 typically relates to and may be comprised in the upstream node 136, and the analysis of measurements entity 408 typically relates to and may be comprised in the measuring node 150. The dropper entity 414 typically relates to and may be comprised in the rate limiting node 139. The topology map providing entity may also be comprised in the measuring node 150 or in some other node configured to provide the topology map or corresponding information to the measuring node 150.

Each shown cell site 401a-c comprises a respective active measurement responder, a respective Radio Resource Management (RRM) decision logic and a respective radio scheduler etc. However, to simplify presentation, in the following only one of the cell sites 401a-c, e.g. cell site 401a, may be referred to as the cell site 401 and comprises an active measurement responder 406, a RRM decision logic 410 and a radio scheduler 412. The respective functionality of, and relations between, the entities will be realized from the below and from what has been discussed above. For example, the active measurement responder 406 typically relates to and may be comprised in the downstream node 138. The RRM decision logic 410 typically relates to and may be comprised in the radio resource managing node 160. The radio scheduler relates to the above-mentioned scheduler that typically relates to and may be comprised in the base station 110 for example in an LTE based network or in a separate node, e.g. the RNC, in case of an UMTS based network.

Between the cell sites 401a-c and the hub site 402 a transport network (TN) 403 is depicted, which corresponds to the transport network 130 discussed above. The transport network 403 is shown comprising four portions 404a-d of data transport paths. For example, portions 404a,d forms a data transport path between the cell site 401a and the hub site 402, portions 404b,d forms another data transport path between the cell site 401b and the hub site 402 etc.

As mentioned above, the active measurement protocol may be configured to repeatedly, e.g. periodically, measures a load in the transport network, e.g. in the data transport path formed by portions 404*a,d*. If the used protocol is the one or a similar one as mentioned and referred to above, the active measurement server 405 may inject a packet train in the that periodically is sent to the cell site 401*a* and thus pass through the data transport path 401*a,d*. The cell site 401 may after receipt send the packets back to the hub site 402. A measurement action 407, indicated by a double arrow in FIG. 2 represent the measurement actions taking part between the active measurement server and responder 405, 406 and corresponds to the actions 301*a,b* above. Which exact algorithm and/or active measurement protocol that is used is not crucial but should be capable of repeatedly sample load and or available bandwidth in the transport network 403, with sufficient precision, and of course not causing so much extra traffic that the measurements as such significantly contribute to congestion.

The analysis of measurements entity 408 may analyse and process the resulting measurement data from the active measurement server 405. This is advantageous but in some embodiment the resulting measurement data may be sent to the cell site 401*a*, e.g. without first being analysed, and analysing may instead or additionally take part in the cell site 401*a*. In any case, what is sent to the cell site, based on the performed measurements, is in FIG. 4 indicated by a feedback action 409 in the form of an arrow and corresponds to action 302 above. The content of the feedback may have many different forms, for example:

Binary: The TN is congested/not congested
Load levels: The TN load level in a scale of [1 . . . x]
TN bottleneck utilization: The utilization of the TN bottleneck in percentage
TN load, TN bottleneck capacity: The exact values measured by the active measurement protocol, e.g. in kbit/s As already mentioned, the feedback may be sent periodically, e.g. every second or every few seconds, and in some embodiments it may be sent only when a relevant state change is identified based on the measurements, e.g. that the transport network 403 changes from a not congested state to congested state or vice versa, or that a load of the transport network 403 has increased and/or decreased with an amount higher than a configured threshold, e.g. since previously measured and/or checked.

In FIG. 4 the feedback is received by the RRM decision logic 410. Once the feedback is received by the RRM decision logic 410 it may decide to implement actions if, based on the received feedback, the transport network is found to be congested or that there is risk for congestion. The decision corresponds to action 303 above. In response to the decision the RRM decision logic 410 controls the radio scheduler 412 to reduce and/or limit the throughput of the radio scheduler to thereby create the artificial bottleneck in the radio domain as discussed above. The control of the radio scheduler 412 is in FIG. 4 indicated by an action 411 in the form of an arrow and corresponds to action 304 above.

The decision to be taken by the RRM decision logic 410 and the decision according to action 303 above, as well as what reduced and/or limited throughput rate to be achieved by controlling the radio scheduler 412, such as by action 411 and/or by the command to the base station in action 304 above, may be implemented in a number of ways. Some will be explained in the following:

In a naïve method a load threshold Y is defined, e.g. in Mbit/s or in percentage of bottleneck utilization. If the measurement indicated a load X that is smaller than Y, no action is taken. If the indicated load X is higher than Y, the throughput rate may be reduced to Y e.g. by controlling the serving rate of the radio scheduler.

In a first hysteresis method a load threshold Y is defined, e.g. in Mbit/s or in percentage of bottleneck utilization. If the measurement indicated a load X that is smaller than Y, no action may be taken. If the indicated load X is higher than Y, the throughput rate may be reduced and/or limited to Z, where Z is higher than Y.

In a second hysteresis based method two load thresholds Y1 and Y2 are defined in e.g. Mbit/s or in percentage of bottleneck utilization, where Y1<Y2. The RRM decision logic 410 and/or the radio resource managing node remembers a congestion state and e.g. when the TN is in an "uncongested" state. If the TN is in "uncongested" state and the measurement indicates a load X lower than Y2, no action is taken. On the other hand, if it Is indicated a load X that is higher than Y2, the throughput rate may be reduced and/or limited to Y2, and the TN congestion state is changed to "congested" and remembered. If the indicated load is below Y1, then the throughput rate may be set, i.e. increased, to a normal, non-reduced and/or non-limited rate, and the congestion state set to "uncongested" and remembered.

Note that when e.g. Y and/or Y2 in the naïve method and/or the second hysteresis method are set to a value that corresponds to a risk for congestion and not actual congestion, the reduction of the throughput rate to Y and/or Y2 and/or Y2 is at the same time a limitation of the throughput rate. When e.g. Y and Z in the first hysteresis method are both set to a value that corresponds to a risk for congestion and not actual congestion, there is a limitation of the throughput rate to Z that not necessarily involves a reduction of the throughput rate.

Still referring to FIG. 4. In order to handle the above-mentioned non-adaptive type of traffic the dropper entity 414 and/or the rate limiting node 139 may be utilized as a form of extension or add-on for reducing and/or limiting the throughput rate of the data being transmitted to the one or more wireless devices in the radio domain. As in the examples of FIG. 2 and FIG. 4, the dropper entity 414 is preferably implemented in the upstream node 136 but may is some embodiments be implemented in another node above the bottleneck. In connection with reduction and/or limitation of said throughput rate, e.g. in response to decision to at least reduce an identified risk for congestion, the RRM decision logic 410 and/or the radio resource managing node 160 may send instructions to the dropper entity 414 to reduce and/or limit the throughput of certain data transport flows e.g. by policing them. The instructions sent to the dropper entity 414 is in FIG. 4 indicated by an action 413 in the form of an arrow and corresponds to action 306 above. The RRM decision logic 410 may obtain measures of e.g., the bitrate of these data transport flows in e.g. an incoming interface to the transport network 403, e.g. in a gateway node, and may e.g. take the following decisions for each measured data transport flow:

Police the data transport flow to a measured bitrate*Y/X, if the naïve method described above is used.
Police the data transport flow to a measured bitrate*Z/X, if the first hysteresis based method described above is used.
Police the data transport flow to measured bitrate*Y2/X, if the second hysteresis based method described above is used.

In the examples described above, the change of an allowed bitrate in percentage, i.e. relative change, may be the same. However, in some embodiments, some data transport flows may be more reduced and/or limited than others, if e.g. required by the QoS policies. For example, if the indicated load X is under the threshold Y, or Y1, respectively, it may be signalled to the dropper entity 414 that policing shall be disabled for one or more data transport flows. In other embodiments, the dropper entity 414 may be instructed to gradually change, e.g. increase, the policing rate to avoid fluctuations. As should be understood by the skilled person, the method according to embodiments herein may be extended to reduce and/or limit only a subset of non-adaptive data transport flows that may be present. A data transport flow associated with a voice radio bearer is an example of a data transport flow that may not be subject to policing in the dropper entity 414. Note that also other solutions than described herein for solving potential problems relating to non-adaptive data transport flows may be utilized. For example, partially deployed ConEx, e.g. as described in Kutscher, Dirk, et al. "*Mobile Communication Congestion Exposure Scenario.*", IETF draft draft-ietf-conex-mobile-01, 2013, may provide a solution and is compatible and may coexist with embodiments herein.

Since embodiments herein, as mentioned above, are typically implemented by means of a scheduler, the scheduler, e.g. one as conventionally used in LTE, and how it may be adapted for the implementation will now be discussed in some further detail.

The scheduler may be a typical scheduler that has a single queue per radio bearer. At every scheduling opportunity, the scheduler may calculate a weight for each queue and selects the one with the highest weight to transmit in the scheduling opportunity, which in LTE corresponds to a pair of resource blocks. The weight calculation may be accomplished according to conventional QoS-aware scheduling, e.g. delay-based scheduling, proportional fair scheduling with relative priorities, or other priority schemes. To some extent also channel quality may be taken into account to increase cell throughput. Additions and/or modifications to a conventional scheduler for implementation of embodiments herein may comprise one or more of the following:

A measurement of aggregated throughput over the air interface for a short period of time may be obtained, e.g. by the radio resource managing node 160 and/or the RRM decision logic 410. The scheduler may then be commanded not to schedule traffic in the next short period of time, or until the aggregated throughput over a longer time period falls below a desired serving rate. i.e. a desired reduced throughput rate. The short period of time may e.g. be a few milliseconds or tens of milliseconds.

A weight bonus may be given, e.g. by the radio resource managing node 160 and/or the RRM decision logic 410, to data transport flows that have already been policed in the rate limiting node 139 and/or the dropper entity 414, ensuring that they will be scheduled early and their packets will not be dropped. The reason is that such data transport flows have already reduced and/or limited their rate in the transport network due to policing, and should not be punished twice. A basic weight calculation method in the scheduler need not be changed at all with possible exception for the data transport flows that may get weight bonus because they have been already policed. Hence, the scheduler will take existing QoS parameters, e.g. relative priorities, absolute priorities, delay budgets etc., into consideration also at the reduced and/or limited throughput rate, which will typically automatically result in a desired prioritization also at the reduced and/or limited throughput rate.

As mentioned above, the reduced and/or limited throughput rate corresponds to an artificial bottleneck or emulated congestion created at the radio interface. When queues grow at the radio interface owing to this, it may be desirable to activate mechanisms such as Acive Queue Management (AQM) and/or other buffer management, earlier than else would be the case as this will be an indication of congestion that is signalled upstream and enabling traffic sources and adaptive data transport flows to adapt earlier.

Another possibility is to, when calculating the scheduling weights, assume the same channel quality for all bearers, e.g. a perfect channel. This may be motivated by the fact that the transport network is the actual bottleneck when embodiments herein are applied, and over the transport network all radio bearers may be considered to take the same amount of resources to serve.

Above it has only been discussed cases when a single cell site, e.g. cell site 401a, does not share a transport network bottleneck with other cell sites, e.g. cell sites 401b-c. This may be the case when the last separate link leading to the base station comprise the bottleneck, e.g. portion 404a of the data transport paths shown in FIG. 4. When instead the bottleneck is shared, e.g. comprised in the portion 404d of the data transport path, and thus is shared between the cell sites 401a-c, a topology map such as provided by the topology map providing entity 415 may be used. The topology map is a map that comprise information about what links in the data transport network, such as the portions 404a-c of data transport paths, that are shared between which cell sites. Assume that measurements of load in the transport network are performed repeatedly, e.g. periodically, i.e. in FIG. 4 between the hub site 402 and the cell sites 401a-c. When e.g. a measurement method as exemplified above is used, the capacity and available bandwidth will then be known for each data transport path associated with respective cell site 401a-c, such as the data transport path formed by the portions 404a,d of the data transport path, which data transport path is associated with the cell site 401a. Each hub site, e.g. the hub site 402, may then correlate these results to the topology, e.g. in the analysis of measurement entity 408, with the topology map as input.

Assume now that the bottleneck is in the portion 404d shared by cell sites 401a-c. By correlating information it may be found out, e.g. by the analysis of measurement entity 408 in the ell site 401a and its respective counterpart in the cell sites 401b-c, that the portion 404d is a bottleneck. Say the bottleneck capacity is 30 Mbit/s, and e.g. 3 Mbit/s available bandwidth is found. In a simple case resources may be equally shared between the cell sites 401a-c. Hence, 3/3=1 Mbit/s of bandwidth may be considered available for each cell site 401a-c, translating 9 Mbits/s load, or 90%. Then e.g. the feedback action 409 may report this to the RRM decision logic 410 of cell site 401a, and to its respective counterpart in the cell sites 401b-c. This might trigger the action 411 as discussed above so that at least in case of an identified situation of congestion or risk thereof, one or more of a respective base station of the cell sites 401a-c is controlled to operate at a reduced and/or limited throughput rate that in the example case is reduced and/or limited to the maximum throughput rate of 30/3=10 Mbit/s.

Figure 5:
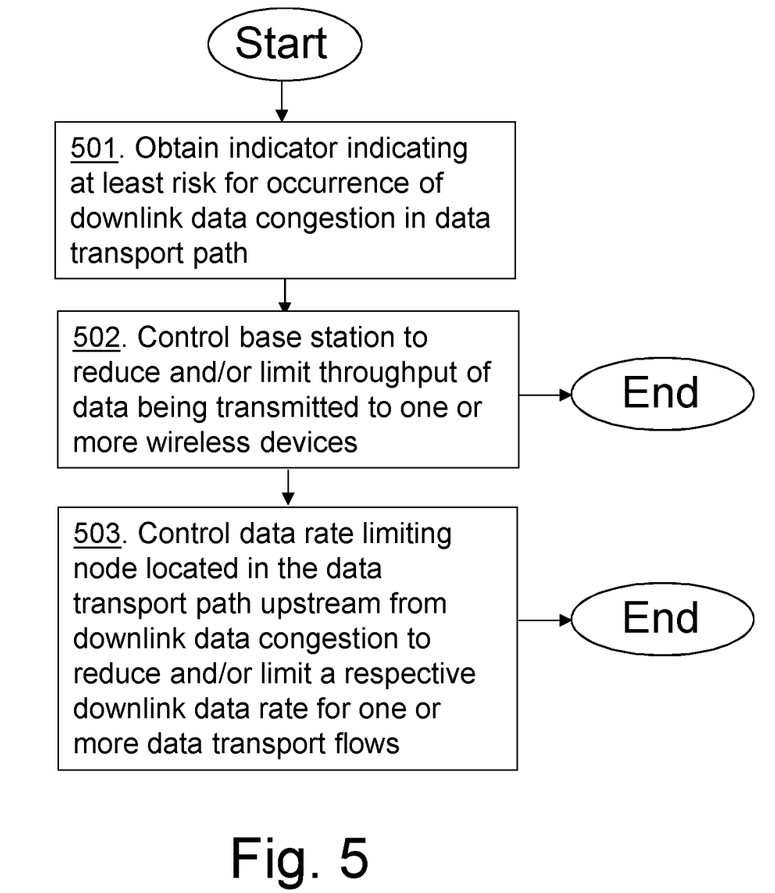
FIG. 5 is a flow chart illustrating a method in a network node according to embodiments herein.

Embodiments herein relating to a method in a network node, e.g. the radio resource managing node 160, the base station 110 or any of the cell sites 401a-c, for congestion management of a transport network, exemplified by the transport network 130 in the following, will now be further elaborated and described with reference to the flowchart depicted in FIG. 5. The transport network 130 is comprised in a wireless communications network, exemplified by the wireless communications network 100 in the following. The wireless communications network 100 comprise a base station, exemplified by the base station 110 in the following, configured to receive data being transported via a data transport path, e.g. the data transport path 132 or the data transport path formed by the portions 404*a,d*, of the transport network 130. The base station 110 is further configured to transmit the received data to one or more wireless devices, exemplified by the one or more wireless devices 120 in the following, that are served by the base station 110. In some embodiments, the base station 110 shares the data transport path 132 at least partially with one or more additional base stations configured to receive data via a shared part of the data transport path 132. This corresponds to the example above where the cell site 401*a*, which as mentioned corresponds to or comprise a base station corresponding to the base station 110, shares the portion 404*d* of the data transport path 404*a,d* with the cell sites 401*b-c*. As mentioned, the cell sites 401*a-c* each correspond to or comprise a respective base station of their own.

The method comprises the following actions, which actions may be taken in any suitable order. Further, actions may be combined.

Action 501

The network node, e.g. the radio resource managing node 160, the base station 110 or any of the cell sites 401*a-c*, obtains an indicator indicating at least a risk for occurrence of downlink data congestion in the data transport path, e.g. the data transport path 132 or the data transport path formed by the portions 404*a,d*.

In some embodiments the indicator is based on a measurement of performance between two network nodes, e.g. the upstream and downstream nodes 136, 138 or the cell and hub sites 401*a*, 402), located in the data transport path. The measurement of performance may be based on a measurement protocol being applied to a data transport between the two network nodes located in the data transport path. In some embodiments, one of the two network nodes, e.g the upstream node 136 or the hub site 402, is associated with a gateway node, e.g. the gateway node 134, of a core network, e.g. the core network 102, comprised in the wireless communications network 100. In some embodiments, one of the two network nodes, e.g. the downstream node 138 or the cell site 401*a*, is associated with the base station 110. The measurement of performance may be part of multiple measurements of performance that are performed repeatedly, such as periodically Moreover, in some embodiments, the indicator comprises a binary indicator indicating congestion or no congestion and/or a load level indicator indicating a level of data load.

An indicator based on measurement of performance between two network nodes in the data transport path may be advantageous since it enables implementation that is comparatively independent on which equipment being involved for data transport in the data transport path. However, in some embodiments the indicator may be received directly from one or more equipment located in the data transport path, e.g. a hub, switch or router. The indicator may in such case be some warning signaling provided by the equipment, e.g. generated when the equipment has not sufficient capacity to properly handle data being fed to it. The equipment may e.g. be configured to, on occurrence, send such indicator to the network node and/or the network node may be configured to regularly check for and retrieve such indicator from the equipment generating it.

This action may correspond fully or partially to the previously described Actions 302, 409.

Action 502

To reduce said at least risk, the network node, e.g. the radio resource managing node 160, the base station 110 or any of the cell sites 401*a-c*, controls the base station 110 to reduce and/or limit a throughput rate of data being transmitted to the one or more wireless devices, e.g. the one or more wireless devices 120. The data is received by the base station 110 via the data transport path, e.g. the data transport path 132 or the data transport path formed by the portions 404*a,d*.

The indicator may be obtained repeatedly, e.g received or retrieved periodically, for example in response to that the measurements of performance have been performed.

When the obtained indicator comprises the load level indicator indicating a level of data load, as mentioned above under Action 501, the base station 110 may be controlled to reduce and/or limit the throughput rate in response to that the indicated level of data load is equal to or larger than a threshold, exemplified by T in the following, associated with the data transport path. The throughput rate may be reduced and/or limited to a level that is based on the threshold T.

The threshold T may be associated with an identified potentially problematic, e.g. bottleneck, capacity of the data path. The problematic capacity may correspond to a known or identified lowest maximal capacity among maximal capacities, where each maximal capacity is associated with a respective part and/or portion of the transport data path, e,g. the portion 404*d*. The threshold T may thus be predefined and/or predetermined. In some embodiments the threshold T may be obtained in association with the obtained indicator.

In some embodiments the throughput rate is reduced on average during a period of time by purposely lowering the throughout rate during only a part of said period of time.

The throughput rate may be reduced and/or limited to a data rate level based on the threshold T.

For example: The throughput rate may be reduced and/or limited to a throughput rate corresponding to the threshold T or above. This corresponds to Y, Z and Y2 in the naïve method, the first hysteresis method and the second hysteresis method discussed above. The throughput rate may be reduced and/or limited to a throughput rate that is a first offset value above the threshold T. The first offset value may correspond to Z-Y in the first hysteresis method discussed above, where Z is Z-Y above Y. Moreover, the reduction and/or limitation of the throughput may be removed when a subsequently obtained load level indicator indicates a level of data load that is equal to or below another threshold, for example corresponding to Y1 in the second hysteresis method discussed above. For example when the subsequently obtained load level indicator indicates a level of data load that is a second offset value below the threshold T. The second offset value may correspond to Y2-Y1 in the second hysteresis method discussed above, where Y1 is Y2-Y1 below Y2.

This action may correspond fully or partially to the previously described Actions 304, 411.

Action 503

This action is an optional action for embodiments herein. To reduce said at least risk, the network node, e.g. the radio resource managing node 160, the base station 110 or any of the cell sites 401*a-c*, also controls a data rate limiting node, e.g. the data rate limiting node 139 or the hub site 402, located in the data transport path upstream from the downlink congestion to reduce and/or limit a respective downlink data rate for one or more data transport flows.

In some embodiments, the base station 110 is further controlled to exclude said one or more data transport flows from the reduction and/or limitation of the throughput rate of the data being transmitted to the one or more wireless devices 120.

This action may correspond fully or partially to the previously described Actions 306, 413.

In addition to advantages already discussed, advantages of embodiments herein include:

QoS-differentiation is enabled in a transport network, such as the transport network 130, even when it only implements a single traffic class, with simple First-In-First-Out (FIFO) queues.

QoS need not be configured separately in a transport network, a core network and/or a radio access network, such as the transport network 130, the core network 102 and the radio access network 104. QoS enforcement may instead be made only in the radio access network and there to large extent by utilizing already existing and efficient methods.

Queuing delays in a transport network, such as the transport network 130, are reduced and packet loss ratios may be eliminated.

Figure 6:
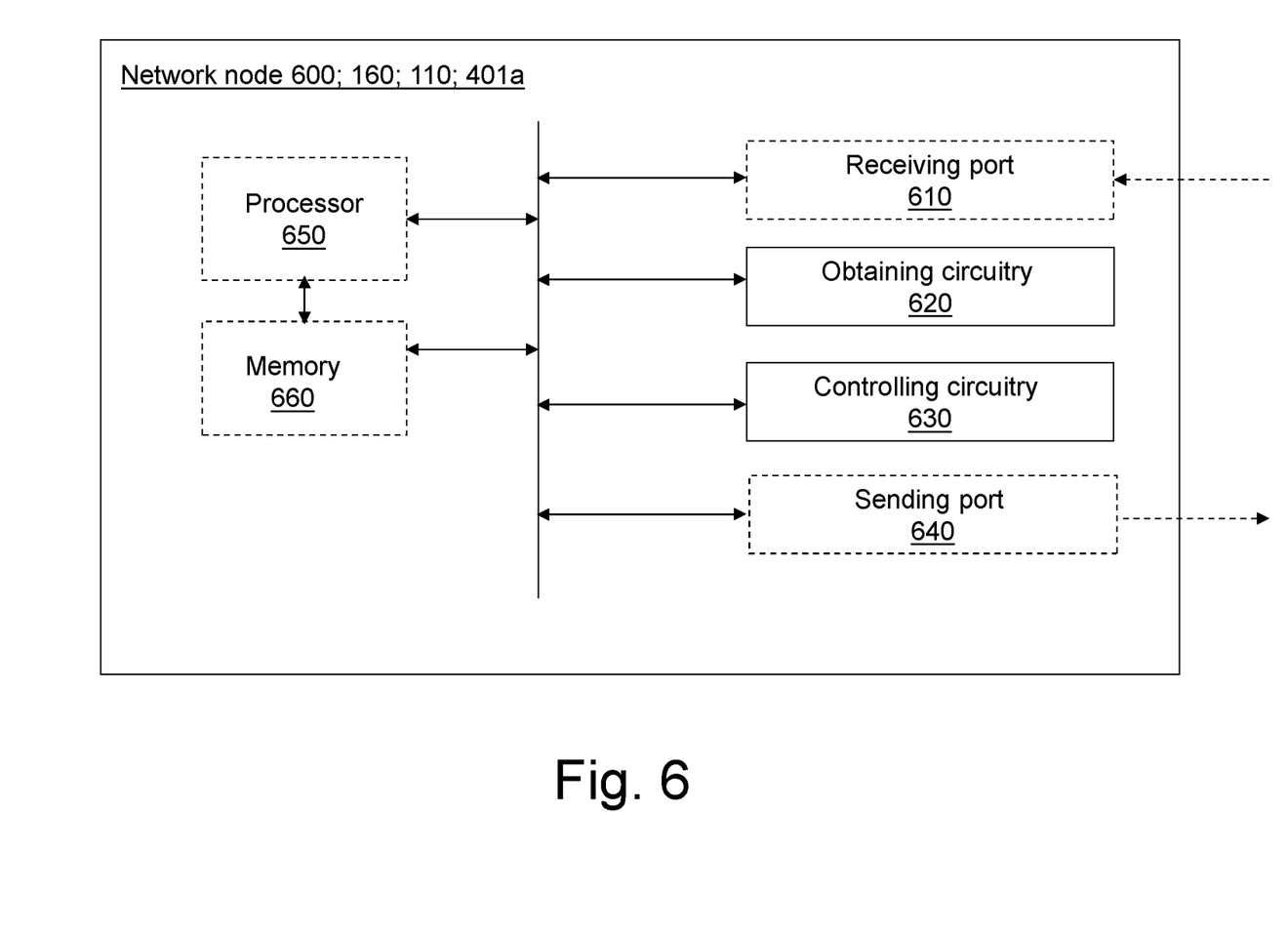
FIG. 6 is a schematic block diagram illustrating a network node according to embodiments herein.

To perform the actions 501-503 above for congestion management of the transport network 130, the network node, e.g. the radio resource managing node 160, the base station 110 or any of the cell sites 401a-c, may comprise an arrangement schematically depicted in FIG. 6, which refers to the network node as a network node 600 that thus in some embodiments may correspond to the radio resource managing node 160, the base station 110 or any of the cell sites 401a-c.

The network node 600 comprises an obtaining circuitry 620 configured to obtain the indicator indicating said at least a risk for occurrence of downlink data congestion in said data transport path.

The network node 600 further comprises a controlling circuitry 630 configured to control, to reduce said at least risk, the base station 110 to reduce and/or limit the throughput rate of data being transmitted to the one or more wireless devices 120, where the data is received by the base station 110 via said data transport path.

In some embodiments the controlling circuitry 730 is further configured to control, to reduce said at least risk, said data rate limiting node located in sad data transport path upstream from the downlink congestion to reduce and/or limit a respective downlink data rate for one or more data transport flows. Moreover, the controlling circuitry 730 may be further configured to control the base station 110 to exclude said one or more data transport flows from the reduction and/or limitation of the throughput of the data being transmitted to the one or more wireless devices 120.

The network node 600 typically also comprise a receiving port 610 configured to receive information to and be involved in communication with other nodes and units, e.g. the upstream node 136 and/or the measuring node 150 and/or the hub site 402, discussed above. For example, in embodiments where the network node 600 is separate from the measuring node 160 or when the analysis of measurements entity 408 is comprised in the hub-site 402, the receiving port 610 may be configured to receive the indicator which then is obtained by the obtaining circuitry 620.

The network node 600 typically also comprise a sending port 640 configured to send information to and be involved in communication with other nodes and units, e.g. the upstream node 136 and/or the rate limiting node 139 and/or the hub site 402, discussed above. For example, in embodiments where the network node 600 is separate from the base station 110, the control circuitry 630 may be configured to control the base station 110 as described above by making the sending port 640 send a command to the base station 110.

The embodiments of the network node 600 may be implemented through one or more processors, such as a processor 650 in the network node 600 depicted in FIG. 6, together with computer program code for performing the functions and actions of embodiments herein. In some embodiments the circuitry discussed above may be fully or partially implemented by the processor 650.

The computer program code mentioned above may also be provided as a computer program product, for instance in the form of a data carrier carrying computer program code for performing the embodiments herein when being loaded into the in the network node 600. One such carrier may be in the form of a CD or DVD. It is however feasible with other data carriers such as a memory stick, memory card or hard drive. The computer program code may furthermore be provided as pure program code on a server for download to the network node 600. The computer program code may furthermore be provided in the form of a data file or files on, or available through, a server for download. The file or files may be executable files for direct or indirect download to and execution on the network node 600, or may be for intermediate download and compilation to make them executable before download to and for execution in the network node 600. The server may be accessible over a computer network, such as the Internet, and may e.g. be a web or ftp server.

The network node 600 may further comprise a memory 660 comprising one or more memory units. The memory 660 is arranged to store data, such as the indicator, the threshold, and/or configurations and/or applications to perform the method when being executed in the network node 600.

Those skilled in the art will also appreciate that the circuitry and ports 610-740 may refer to a combination of analog and digital circuits, and/or one or more processors configured with software and/or firmware (e.g., stored in memory) that, when executed by the one or more processors such as the processor 650, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Generally, embodiments herein are not limited to the above described features and details. Various alternatives, modifications and equivalents may be used. Therefore, the above embodiments should not be taken as limiting the scope of the invention, which is defined by the appending claims.

When using the word "comprise" or "comprising" it shall be interpreted as non-limiting, i.e. meaning "consist at least of".

The invention claimed is:

1. A method in a network node for congestion management of a transport network comprised in a wireless communications network, the wireless communications network further comprising a base station configured to receive data being transported via a data transport path of the transport network and to transmit the received data to one or more wireless devices being served by the base station, the method comprising:

obtaining an indicator indicating at least a risk for occurrence of downlink data congestion in the data transport path, wherein obtaining of the indicator comprises receiving, from a measuring node, an indicator based on a measurement protocol applied to data transport between an upstream node and a downstream node located in the data transport path, wherein the indicator is a load level indicator indicating a level of data load; and controlling, to reduce the at least risk, the base station to reduce and/or limit throughput rate at which the base station transmits to the wireless devices the data that the base station receives from the upstream transport network nodes via the data transport path, wherein the controlling of the base station comprises controlling the base station to reduce and/or limit the throughput rate in response to that the indicated level of data load is equal to or larger than a threshold associated with the data transport path, wherein the method further comprises: controlling, to reduce said risk, a data rate limiting node located in the data transport path upstream from the downlink congestion to reduce and/or limit a respective downlink data rate for one or more data transport flows, and wherein the base station is further controlled to exclude said one or more data transport flows from the reduction and limitation of the throughput rate of the data being transmitted to the one or more wireless devices.

2. The method of claim 1, wherein a measurement of performance is based on the measurement protocol being applied to a data transport between the upstream node and the downstream node located in the data transport path.

3. The method of claim 1, wherein one of the two network nodes located in the data transport path is associated with a gateway node of a core network comprised in the wireless communications network and/or one of the two network nodes located in the data transport path is associated with the base station.

4. The method of claim 1, wherein the indicator comprises one or more of: a binary indictor indicating congestion or no congestion.

5. The method of claim 1, wherein the throughput rate is reduced and/or limited to a level that is based on the threshold.

6. The method of claim 1, wherein the base station shares the data transport path at least partially with one or more additional base stations configured to receive data via a shared part of the data transport path.

7. A network node for congestion management of a transport network comprised in a wireless communications network, the wireless communications network further comprising a base station configured to receive data being transported via a data transport path of the transport network and to transmit the received data to one or more wireless devices being served by the base station, wherein the network node comprises control circuitry configured to:

obtain an indicator indicating at least a risk for occurrence of downlink data congestion in the data transport path, wherein obtaining of the indicator comprises receiving, from a measuring node, an indicator based on a measurement protocol applied to data transport between an upstream node and a downstream node located in the data transport path, wherein the indicator is a load level indicator indicating a level of data load; and controlling, to reduce the at least risk, the base station to reduce and/or limit throughput rate at which the base station transmits to the wireless devices the data that the base station receives from the upstream transport network nodes via the data transport path, wherein the controlling of the base station comprises controlling the base station to reduce and/or limit the throughput rate in response to that the indicated level of data load is equal to or larger than a threshold associated with the data transport path, wherein the control circuitry is further configured to control, to reduce said risk, a data rate limiting node located in the data transport path upstream from the downlink congestion to reduce and/or limit a respective downlink data rate for one or more data transport flows, and wherein the control circuitry is further configured to control the base station to exclude said one or more data transport flows from the reduction and/or limitation of the throughput rate of the data being transmitted to the one or more wireless devices.

8. The network node of claim 7, wherein a measurement of performance is based on the measurement protocol being applied to a data transport between the upstream node and the downstream node located in the data transport path.

9. The network node of claim 7, wherein one of the two network nodes located in the data transport path is associated with a gateway node of a core network comprised in the wireless communications network and/or one of the two network nodes located in the data transport path is associated with the base station.

10. The network node of claim 7, wherein the indicator comprises one or more of: a binary indictor indicating congestion or no congestion.

11. The network node of claim 7, wherein the throughput rate is reduced and/or limited to a level that is based on the threshold.

12. The network node of claim 7, wherein the base station shares the data transport path at least partially with one or more additional base stations configured to receive data via a shared part of the data transport path.

* * * * *